Nov. 14, 1950 M. F. BATES 2,529,479
AUTOMATIC STABILIZER FOR HELICOPTERS
Filed May 15, 1945 3 Sheets-Sheet 1

INVENTOR
MORTIMER F. BATES
BY
Herbert H. Thompson
his ATTORNEY

Nov. 14, 1950 M. F. BATES 2,529,479
AUTOMATIC STABILIZER FOR HELICOPTERS
Filed May 15, 1945 3 Sheets-Sheet 2
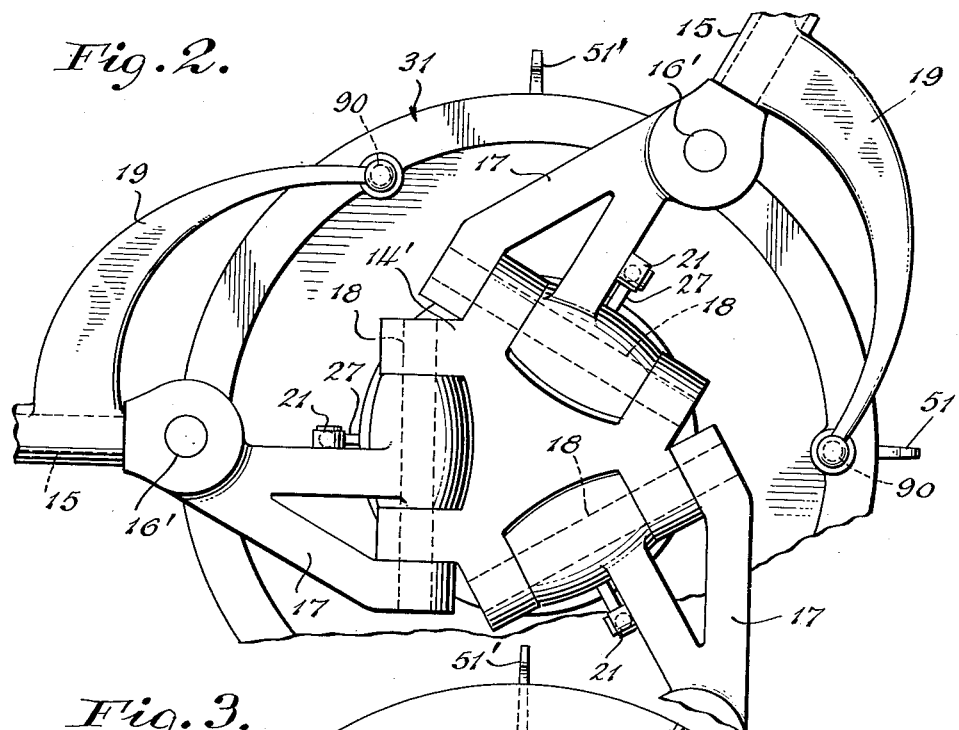
Fig. 2.
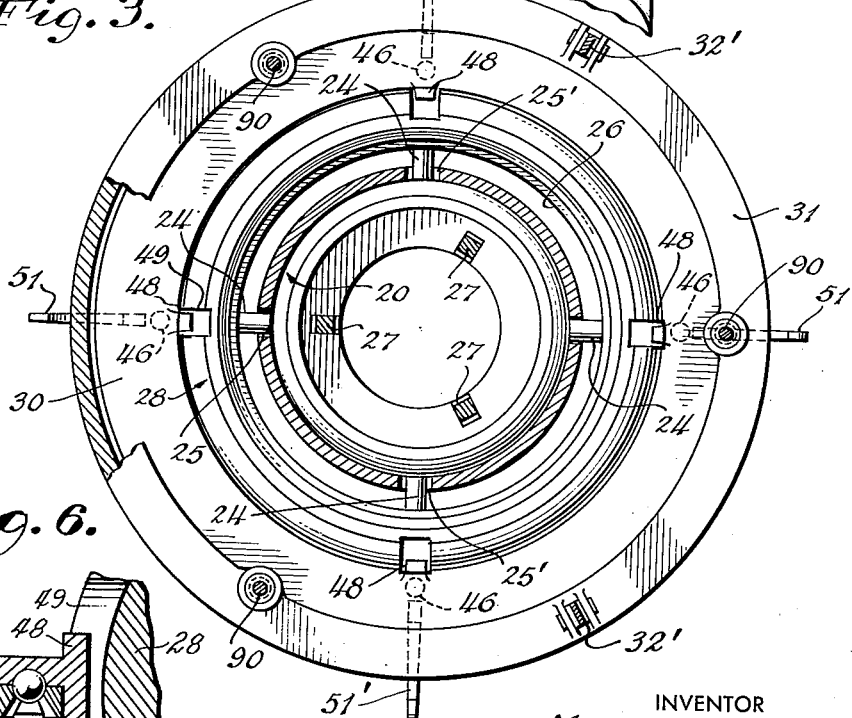
Fig. 3.
Fig. 6.
INVENTOR
MORTIMER F. BATES
BY
Herbert A. Thompson
his ATTORNEY.

INVENTOR
MORTIMER F. BATES
BY
Herbert H. Thompson
his ATTORNEY

Patented Nov. 14, 1950

2,529,479

UNITED STATES PATENT OFFICE 2,529,479

AUTOMATIC STABILIZER FOR HELICOPTERS

Mortimer F. Bates, Brooklyn, N. Y., assignor to The Sperry Corporation, a corporation of Delaware Application May 15, 1945, Serial No. 593,948
In Great Britain November 10, 1944

14 Claims. (Cl. 244—17.13)

1

This invention relates to flight control means for rotary wing aircraft, and particularly to helicopter aircraft wherein the blades are hinged to the hub so as to be capable of up and down vertical movement, generally called flapping, as well as changes of pitch, and the flight control is mainly effected by cyclically changing the pitch of the blades in different portions of a rotational cycle.

One of the principal features of the invention is the arrangement of the controls in such a manner that pendulous swinging movements of the fuselage relatively to the rotor will not introduce spurious control movements which are confusing to the pilot and make the helicopter difficult to fly, especially if an automatic pilot is employed.

Another feature of the invention is an irreversible control system, so that vibrations of the rotor blades will not be fed back through the control system to the pilot's control stick or to the automatic pilot, if employed.

Another feature of the invention is a control system or rotor head of the flapping blade type adaptable for automatic flight control from a gyroscopic artificial horizon.

Other advantages and objects of the invention will become apparent from the specification taken in connection with the accompanying drawings, wherein:

Fig. 2 is a plan view of the rotor hub and the inner end of the blades;

Fig. 3 is a section taken on the line 3—3 of Fig. 1 looking in the direction of the arrows;

Fig. 6 is a detail section of a portion of the control gear illustrated in Fig. 1.

In the type of helicopter to which this invention applies, the fuselage is pendulously supported by the rotor blades through what is, in effect, a universal joint between the rotor hub and the blades. Said hub is rigidly attached to a normally vertical shaft driven by an engine carried in the fuselage and said shaft passes through a bearing in the roof of the fuselage. Each blade is mounted so as to be individually rotatable about a lengthwise axis so that the pitch can be changed as desired. For vertical flight or hovering in still air, the blades are all given the same pitch, so that they have equal lifts, and the rate of climb is adjustable by varying this pitch and at the same time adjusting the engine throttle so as to maintain a substantially constant rotor speed. When it is required to give the helicopter a horizontal velocity in any direction, this is accomplished by cyclic variation of the blade pitch, so timed in azimuth that the blade tip-path becomes inclined from the vertical producing a horizontal component in the desired direction. Consequently, whereas in vertical flight, the circle swept out by the tips of the blades is normally horizontal, in forward flight this blade-tip path becomes inclined with its lowest point forward in the direction of motion.

From this, it will be clear that the direction of horizontal flight of the helicopter depends only on the inclination of the blade-tip path plane and is for a time independent of the heading of the fuselage itself. For this reason the said tip-path plane is the principal element in the system of control, and a knowledge of its attitude with respect to the horizon is essential for both manual and automatic flight. And another function of the control system is to correct for disturbed air conditions that alter the attitude of the blade-tip path plane.

Figure 1:
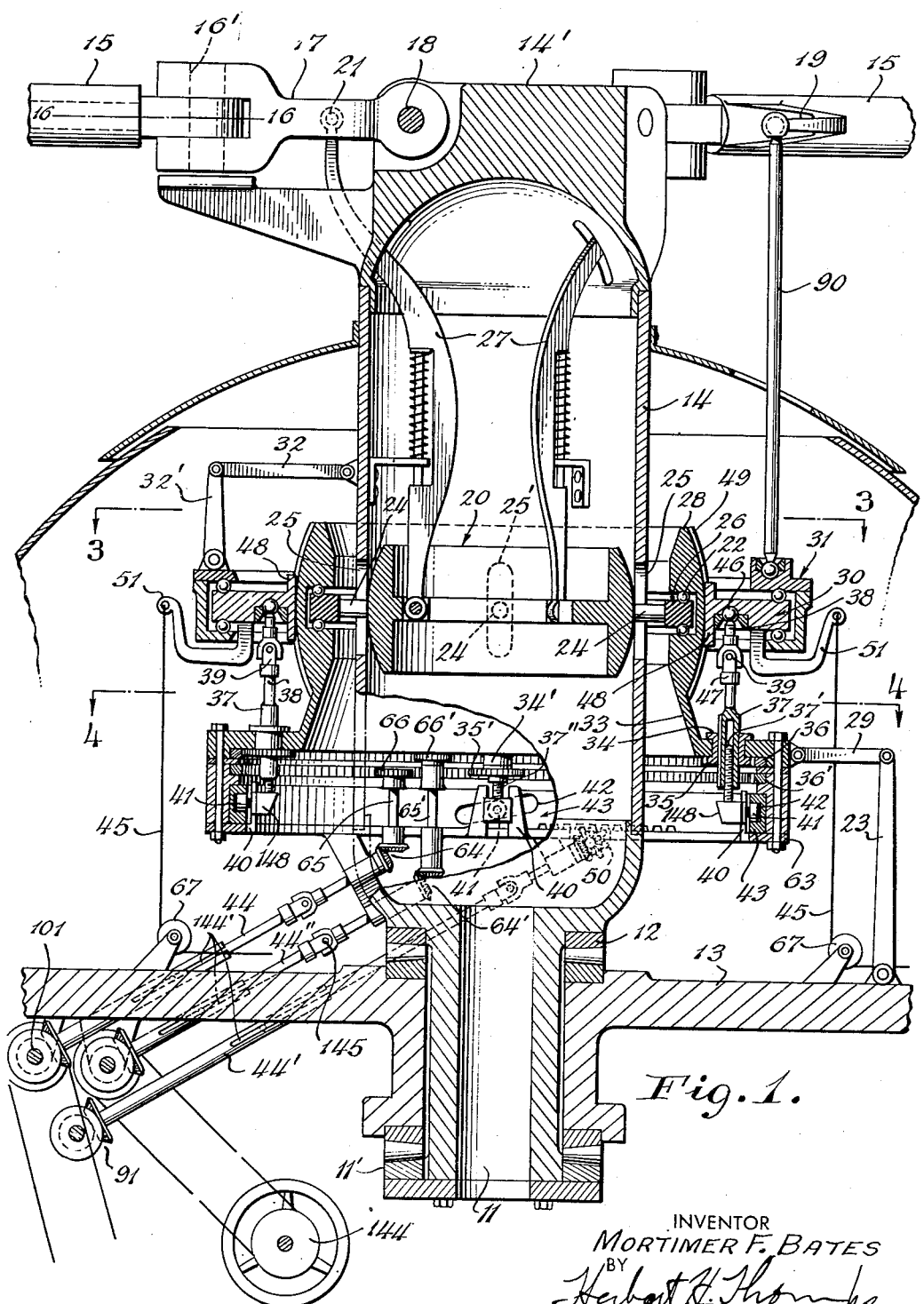
Fig. 1 is a central vertical section of the main drive shaft and control gear of the sustaining propeller of a helicopter.
Figure 4:
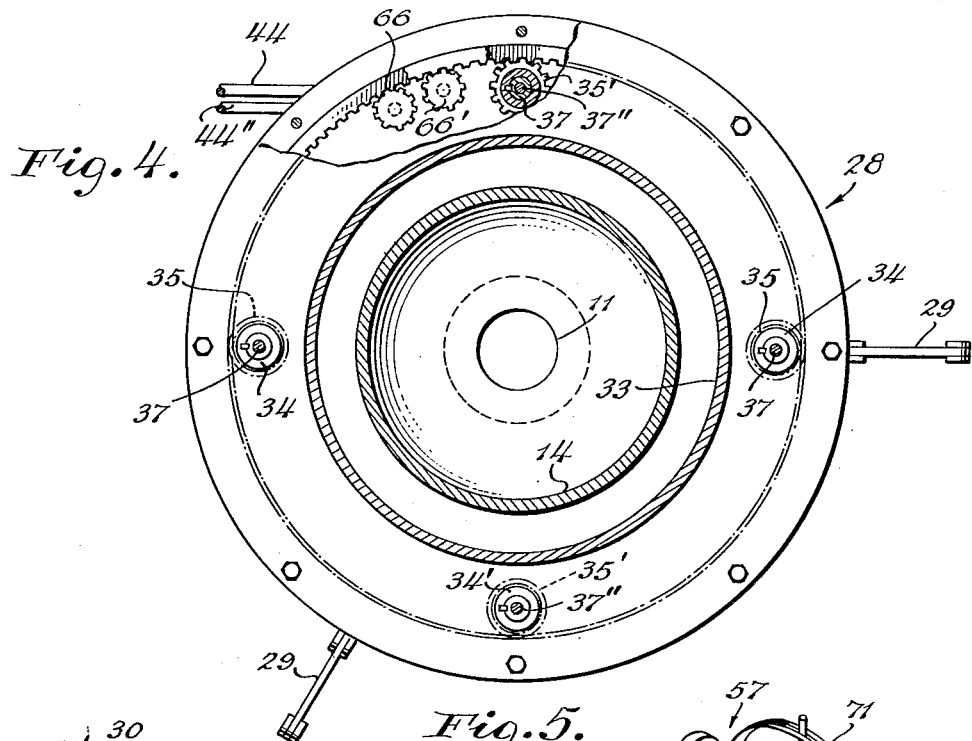
Fig. 4 is a section taken on the line 4—4 of Fig. 1 looking in the direction of the arrows.

Referring to Fig. 1, the main drive shaft 11 passes through the roof 13 of the fuselage by bearings 11' and 12 which support the whole of the weight of the fuselage. The upper end of shaft 11 opens out into a hollow cylindrical member 14 which is closed at the top by a cap 14' forming the rotor hub. This hub, as constructed for a three blade rotor, is shown in plan in Fig. 2, wherein 15 is the shank of one blade which is capable of rotation around an axis 16, 16 for varying the pitch. The blade shank 15 is hinged to the wrist piece 17 by a vertical pivot 16' known as the drag pivot, which allows a limited variation in the angular spacing of the three blades around the circle. The wrist piece 17 is hinged to the hub 14' by a pin 18 forming the flapping pivot whereby the blade as a whole has a freedom to swing up and down in a vertical plane. A pitch arm 19 projecting from each blade shank provides a lever by which the pitch can be varied as described below. The pitch angle is the only angle which is under the direct control of the pilot and movements of the blades around the drag pivot 16' or the flapping pivot 18 are not under direct control.

The manner of controlling the pitch will now be described. Inside the hollow cylindrical shell 14 is a ring 20 made with a spherical periphery, the diameter of the sphere being a sliding fit inside the cylinder 14. Ring 20 is provided as shown in detail in Fig. 3, with four projecting pieces 24 spaced at 90° apart around the ring which engage four vertical slots 25 and 25' in the cylinder 14. Two of the slots 25 at opposite ends of the diameter are made a close sliding fit on the pins 24, but the other two slots 25' on the diameter at right angles have a clearance as shown in Fig. 3 to allow the ring 20 to tilt as hereinafter described. The four projecting pins 24 carry a Saturn-ring plate 26 which surrounds the cylinder 14. The ring 20 is supported at three points 120° apart by vertical links 27. These are hinged at the top by pins 21 in the wrist pieces 17, and it will be clear that so long as all three blades are inclined equally about their flap axes 18, the ring 20 will hang level in the cylinder 14. So long as the plane of the path of the tips for the rotor blades remains horizontal, the ring 20 will also remain horizontal, though if the coning angle of the blades, i. e., their inclination to the horizontal changes, the ring 20 will rise or fall in the cylinder 14 by virtue of the links 27 on which it is supported. On the other hand, if the instantaneous inclinations of the blades are not equal, so that the tip plane is not horizontal, the ring 20 will also become inclined. The Saturn-ring plate 26 therefore reproduces in miniature the position of the tip-path plane and rotates with the blades.

The Saturn-ring plate 26 forms the inner race of a ball bearing, of which the outer race 22 is part of another ring 28 also made with a spherical periphery. This ring 28 is free to ride up or down with the ring 20 and to tilt with it in any direction; that is to say that rings 28 and 20 are coplanar, but whereas ring 20 rotates with the rotor hub, ring 28 is prevented from rotation by the hinged radius arm 29 and a link 23 which connects it to the roof 13 of the fuselage. Preferably, the radius arm 29 is connected to the ring 28 by a suitable ball and socket connection.

The weight of ring 28 is carried through the ball bearing race 22, Saturn-ring plate 26, arms 24, ring 20 and vertical links 27 from the three wrist pins 17 of the hub.

Surrounding ring 28 is a ring 30 which is supported by means hereinafter described and which supports by ball bearings an external ring 31. Ring 31 rotates with the cylinder 14 to which it is attached by links 32' and radial arms 32 hinged on the cylindrical shell 14. Rings 28 and 30 do not revolve with the rotor, but ring 31 does so revolve by virtue of the three radial arms 32 hinged on the cylinder 14 and the three links 32'. As above, it is also preferable that the links 32' connected to cylinder 14 be connected to the ring 31 by ball and socket connections. Moreover, the plane of ring 28 reproduces the tip-path plane of the rotor while the plane of ring 30 is adjustable through the controls to vary the pitch of the blades with movement of the craft. Ring 28 carries a downwardly extending skirt 33 partly closed below by a base plate 63 which is also parallel to the tip-path plane and carries pitch control mechanism. In order that the rings 28 and 30 may have a common azimuth, ring 30 has four inwardly projecting pieces 48 which engage four grooves 49 spaced 90° apart around the periphery of ring 28. As shown in greater detail in Figs. 3 and 6, the grooves 49 are preferably of such depth as to provide some measure of clearance between the inner face of pieces 48 and the bases of the grooves, the sides of the pieces 48 lying in close fitting, slideable contact with the sides of the grooves 49.

Ring 30 is supported from the base plate 63 by four equally spaced adjustable rods 37, 37'. Each of these rods connects to ring 30 at the top by the ball joint 46 and a short rod 38 leading to the Hooke's joint 39. Below the Hooke's joint is a shaft 37 which is rotatable relatively to the Hooke's joint because of the bearing 47. The lower part of shaft 37 is enlarged and provided with a threaded tubular hole which engages the lower screwed rod 37', so that the length of the two parts 37 and 37' together can be varied by rotating the shaft 37. The screwed rod 37' terminates at its lower end in a block 148 which can slide up and down in the slotted plate 40 carried on the base plate 63. Block 148 also carries a roller 41 at the back of the slotted plate 40 which engages inclined slots 42 in a ring 43 rotatable on the base plate 63 by a toothed wheel 50 which engages a rack cut on the lower edge of the ring 43 and driven by the main control shaft 44' through bevel gear 91. When ring 43 is so rotated, the four blocks 148 are raised or lowered together by the inclined slots 42 cooperating with the rollers 41 and each of the four screw rods 37, 37' is raised or lowered and in turn ring 30 is raised or lowered equally all around. This upward or downward movement of ring 30 involves a corresponding movement of ring 31 which by means of three rods 90 is connected to the levers 19 of the three rotor blades and the three blades, therefore, all have their pitch changed by the same amount. Referring now to the four rods 37 which screw onto the four rods 37', respectively, these rods 37 slide in collars 34 which are adapted to rotate rods 37 by means of splines and feathers. The collars 34 have toothed flanges or pinions 35, 35' which engage and are driven by internally toothed gear wheels 36, 36'. The two collars which lie on a line fore-and-aft in the fuselage are driven by internal toothed gear 36 and the screws 37' are respectively right and left hand for this pair. When ring 36 is rotated, it drives the two collars 34 by the pinions 35 and, by virtue of the right and left hand screws, lowers one side of the ring 30 and raises the other side relatively to the base plate 63 which is itself parallel to the tip-path plane. The collars 34' splined on the pair of screws 37'' which lie athwart the fuselage also have gears 35' engaging with the second internally toothed wheel 36' below the ring 36. Again the screws are made right and left handed, so that rotation of the internally toothed gear 36' tilts the ring 30 at right angles to the tilt produced by rotation of ring 36. Rings 36' and 36 are driven by main control rods 44 and 44'' through bevel gearing 64, 64', shaft 65 and pinion 66 and corresponding gear 64', shaft 65' and pinion 66' respectively. The two control rods 44', 44'' are connected to the control stick diagrammatically represented by hand wheels 144 in the usual way, so that when the stick is moved forward or backward the ring 36 is rotated, the two diametrically opposite rods 37 are respectively lengthened or shortened and the ring 30 is given a forward or backward tilt, relatively to the tip-path plane, thereby producing a cyclic change in the pitch of the blades through the pitch control rod 90 and pitch lever 19. Similarly, if the stick is moved from side to side, the second internally toothed gear operates on the other pair of rods and gives to ring 30 an inclination at right angles.

It should be noted as a characteristic of great importance for the smooth working of the helicopter that the control is exercised entirely between the base plate 63 and the pitch control ring 31. Both of these elements are detached from the fuselage since base plate 63 is ultimately supported by the links 27 from the wrist pieces 17 of the blades, and the pitch ring 31 is connected to the blades by the pitch arms 19. Consequently any reactions from the pitch arms 19 cannot reach the fuselage but are taken up entirely on the wrist pieces 17 of the blades themselves.

Moreover, the pitches of the screw threads on the rods 37' and of the inclined slots 42 are made small so that the drive in each case is irreversible and the control rods 44 and 44' cannot be turned by reactions from the ring 30. Vibrations due to rotor reactions of the control stick which operates the rods 44 and 44' are therefore prevented. The control stick is hinged to the fuselage and partakes of the pendulous swinging motions of the latter, while the base ring does not. To allow these relative movements to occur the rods 44, 44' and 44'' are provided with splined telescopic sections 144' and universal joints 145 as shown in Fig. 1 which also serve further to insulate the fuselage from any vibrations or reactions coming from the rotor through the control mechanism.

Figure 5:
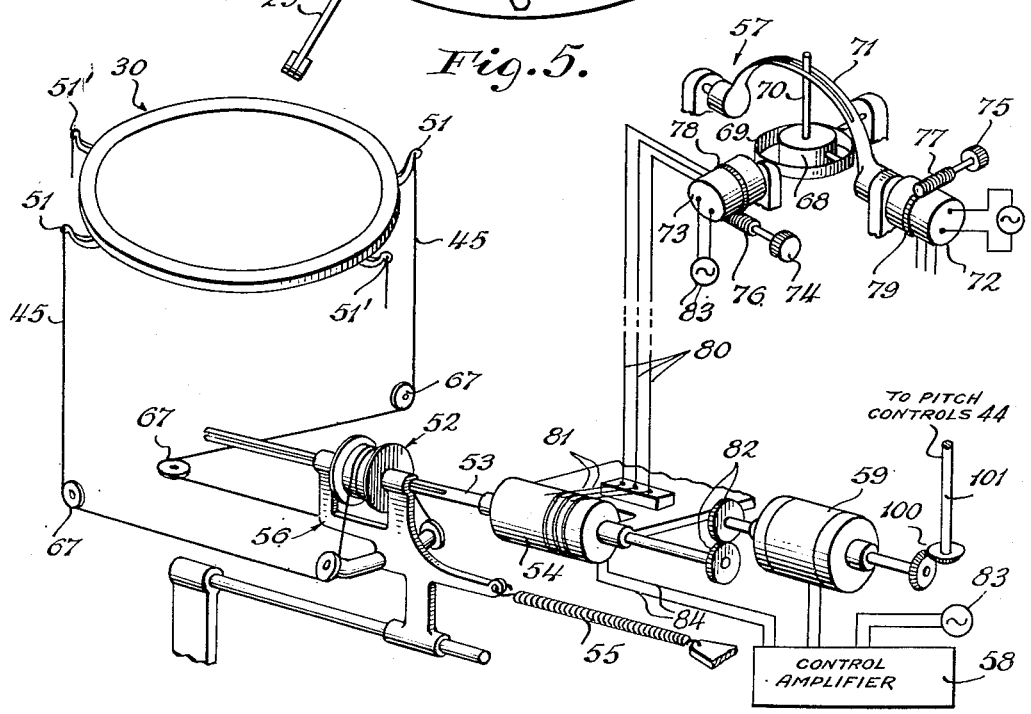
Fig. 5 is a schematic diagram of an automatic pitch control device.

The system may be adapted for automatic control from a gyroscopic horizon or other standard of position as follows: The ring 30 carries two pairs of arms 51 and 51' spaced 90° apart and from these arms cables 45 are taken over pulleys, as shown in Fig. 5. This figure shows only the parts required for one set of controls, say in the fore-and-aft direction. The controls for the athwartship direction may be exactly the same but taken from the second pair of arms 51'. Two cables 45 are taken from two diametrically opposite arms 51 and led around pulleys 67 to a drum 52. The drum 52 is mounted on a splined shaft 53 which carries the body or field of a selsyn signal generator 54. A spring 55 acting on the frame 56 keeps the cables 45 in constant tension in spite of raising or lowering of ring 30 for common pitch control. The angular displacement of the drum 52 from its zero position is then equal to the angle of tilt of the ring 30 relatively to the fuselage.

The gyro vertical 57 provides a reference plane from which the inclination of the ring 30 is measured; and in spite of the fact that the base of the gyro vertical instrument is mounted in the fuselage and partakes of its motions, the form of control now to be described enables a direct comparison to be made between the plane of ring 30 and the horizon as defined by the gyro vertical, independently of the attitude of the fuselage.

The gyro vertical 57 may be of conventional design which includes a rotor casing 68 mounted in a gimbal 69 for movement about two horizontal axes. A shaft 70 projects from the rotor casing 68 moving a bail 71 oppositely to the movement of the fuselage relatively to the gyro about one axis. Movement of the bail 71 turns the rotor winding of a self-synchronous transmitter 72 which is of conventional design. Movement of the fuselage about a second axis causes the gimbal 69 to turn the rotor winding of a second self-synchronous transmitter 73.

The housings or fields of transmitters 72 and 73 are shown adjustable for causing changes of attitude through the automatic pilot by turning the zero setting knobs 74, 75 which operate through worms 76 and 77 engaging worm gears 78 and 79 on the transmitters 72 and 73 respectively. The positions of the stator windings carried by the housings of these transmitters determine the attitude of the ring 30 relatively to the gyro horizon.

The rotor windings of the transmitters 72 and 73 are energized from a suitable source of alternating current, and the stator winding of transmitter 73 is connected as by leads 80 through slip rings 81 to signal generator 54. The following description applies to the control of the helicopter rotor in one direction only, say, fore-and-aft, the apparatus for athwartships control being identical to that for the fore-and-aft control and operating in exactly the same manner. The rotor of self-synchronous generator 54 is driven through gear wheels 82 from a power motor 59 which is driven from the output of control amplifier 58 in accordance with the signal from the rotor winding of the signal generator 54, the energy being derived from a single-phase alternating supply 83. The amplifier 58 then controls the motor according to the relative positions of the two parts of generator 54 and the motor turns the proper control shaft 44 through bevel gears 100 and shaft 101.

The method of operation of the apparatus is as follows, it being first assumed for simplicity that the attitude of the fuselage is fixed. If it is desired to change the attitude of the control ring 30, one of the knobs 74 or 75 is turned, and this rotates the corresponding transmitter, say 73, relatively to one axis of the vertical gyro 57. This, through leads 80, electrically rotates the stator field of the generator 54 relatively to its rotor so that a signal is generated in the rotor winding and transmitted through the leads 84 to amplifier 58. This sets motor 59 into operation to drive the control rod 44 so as to change the inclination of ring 30. As ring 30 is tilted, it rotates the drum 52 by wires 45; and this in turn, through splined shaft 53, rotates the body of generator 54 so that its field and rotor windings are brought into the same position as the corresponding elements of transmitter 73; the signal to amplifier 58 then ceases, and motor 59 comes to rest.

In order that swinging of the fuselage shall not introduce spurious operation of the controls, it is necessary that the drum 52 should be so proportioned with relation to the spacing of the arms 51 on ring 30 that the angle through which the body of the selsyn 54 is turned shall be equal to the angle by which the pair of arms 51 is tilted relatively to the fuselage. Under these conditions if the fuselage tilts relatively to the fixed horizon, it will produce a relative movement between the rotor and stator of the transmitter 72 or 73 on the vertical gyro 57, and this will cause electrical rotation of the stator field of the selsyn 54 relatively to the field of the selsyn. But due to the same cause, the shaft 53 and the field of selsyn 54 will likewise be rotated through the same angle from ring 30. These two displacements will therefore be equal and swinging of the fuselage itself relatively to the horizon will cause no signal to be transmitted to the control amplifier 58. On the other hand, tilting of ring 30 relatively to the gyro vertical such as may be caused for instance by a change in inclination of the tip-path plane and base plate 63 will rotate the field of the selsyn 54 and cause the motor 59 to drive the rotor of the selsyn 54 through the same angle and restore ring 30 to its predetermined position.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In rotary wing aircraft having a rotor with blades free to flap about horizontal pivots in the hub, means for varying the pitch of said blades by rotating them about their lengthwise axes, said means comprising, in combination, a tubular extension of the main driving shaft, a member having a convex curved peripheral surface and fitting closely in said tubular extension and supported by links from the rotor blades so as to rotate therewith and maintain its plane parallel to the plane of the rotor tip path, a ring exterior to said tubular extension and supported by the inner member by radial arms projecting through slots in said tubular extension, a second ring having a convex curved peripheral surface and rotatably supported on said other ring, a cylindrical ring fitting closely around said second ring and supported from said second ring by four supports whose lengths are capable of variation in pairs for giving an inclination to said cylindrical ring, a rotatable controlling ring with inclined surfaces adapted to raise or lower said cylindrical ring, means connecting said controlling ring to said supports, means connecting said cylindrical ring with the rotating blades so as to vary the pitch of the blades either uniformly or cyclically, power means engaging said four supports for varying their lengths in pairs, a gyro vertical, and means connected to said cylindrical ring and said gyro vertical controlling said power means to maintain said cylindrical ring at a predetermined inclination to the horizon.

2. In rotary wing aircraft having a rotor with blades free to flap about horizontal pivots in the hub, means for varying the pitch of said blades by rotating them about their lengthwise axes, said means comprising, in combination, a tubular extension of the main driving shaft, a member having a convex peripheral surface fitting closely in said tubular extension and supported by links from the rotor blades so as to rotate therewith and maintain its plane parallel to the plane of the rotor tip path, a ring exterior to said tubular extension and supported by said member by radial arms projecting through slots in said tubular extension, a second ring having a convex peripheral surface and rotatably supported on said other ring, a cylindrical ring fitting closely around said second ring and supported from said second ring by four supports whose lengths are capable of variation in pairs for giving an inclination to said cylindrical ring, a rotatable controlling ring with inclined surfaces adapted to raise or lower said cylindrical ring, means connecting said controlling ring to said supports, means connecting said cylindrical ring with the rotating blades so as to vary the pitch of the blades either uniformly or cyclically, and means engaging said four supports for varying their lengths either together or in opposite pairs for uniform or cyclic pitch control of the blades.

3. In rotary wing aircraft having a power driven rotor with blades free to flap about horizontal pivots in the hub, said blades being coupled to permit rotation about their longitudinal axis for pitch variations, pitch control means comprising a non-rotating element, means connected to said blades and said element for maintaining the plane of said non-rotating element constantly parallel to the plane of the path of the tips of said blades, a rotating element displaceable in translation and inclination relative to said non-rotating element and connected to said blades so as to vary their pitch cyclically or together, and control means carried on said non-rotating element and operatively connected to said rotating element for causing relative displacement of said rotating element in translation and inclination so as to control the flight of the craft.

4. In rotary wing aircraft having a fuselage and a power driven rotor from which the fuselage is universally suspended, the blades of said rotor being controllable from the fuselage for cyclic pitch variation, a first member, means arranged to maintain a constant relative orientation between said member and the tip path plane of the blades, a second member inclinable relative to said first member and connected to said blades for effecting cyclical pitch variations, a gyro vertical in said fuselage normally producing an indication upon inclination of the fuselage from the horizontal, indication producing means responsive to the inclination of the fuselage relative to said first member, differential means combining said two indications such that a signal is produced only upon inclination of said first means with respect to said gyro vertical, a power operated means responsive to the last-named signal and controlling said second member so as to maintain it constantly at a predetermined inclination to the horizon.

5. In an aircraft of the type having a rotary blade sustaining means and a pendulously suspended fuselage, a non-rotating member mounted to be tiltable in any direction relative to the fuselage, means maintaining said member in constant orientation relative to the plane of the path of the tips of the rotary blades, and pitch control means including mechanisms interconnecting said rotary blades with said non-rotating member whereby pendulous fuselage movements are ineffective insofar as pitch control is concerned.

6. In an automatic pilot for an aircraft having a sustaining propeller, apparatus for controlling the motion and attitude of the propeller comprising a gyroscope for defining a fixed reference plane, a member defining a tiltable plane, means connected to and arranged to maintain a constant orientation between said member and the path of the propeller blade tips, a pick-off connected with said member and said gyroscope for producing a signal corresponding to the tilt thereof relative to said fixed plane, and means responsive to said signal for controlling the thrust axis of said sustaining propeller.

7. In an automatic pilot for an aircraft having a sustaining propeller, apparatus for controlling the motion and attitude of the propeller comprising a gyroscope for defining a fixed reference plane, a member defining a tiltable plane, means connected with and arranged to maintain a constant orientation between said member and the path of the propeller blade tips, a pick-off connected with said member and said gyroscope for producing a signal corresponding to the tilt thereof relative to said fixed plane, means responsive to said signal for controlling the thrust axis of said sustaining propeller, and means for adjusting said pick-off to change said reference plane for controlling the horizontal thrust component of said sustaining propeller.

8. In an automatic pilot for aircraft having a common sustaining and translating propeller and a fuselage pendulously supported therefrom, apparatus for controlling the direction and speed of translation of the craft comprising a gyro vertical, means defining a tiltable plane, means positioning said plane to be constantly parallel to the path of the propeller blade tips, a signal producing means cooperating with said gyro vertical for producing a signal corresponding to relative tilt of said plane and said gyro vertical independently of the attitude of the fuselage, and means actuated by said signal for changing the cyclic pitch of said propeller.

9. In an automatic stabilizer for an aircraft having a sustaining propeller, means for controlling the attitude of the plane of rotation of said propeller whereby to control the flight of said aircraft, means including a gyro vertical for defining a horizontal plane, a member connected to and positioned by said propeller thereby to be maintained in a plane normally parallel to the plane of rotation of said propeller, signal producing means for providing a signal dependent upon angular deviation between said member and said horizontal plane, and means for supplying said deviation signal in controlling relation to said propeller controlling means.

10. In a flight control apparatus for a rotary wing aircraft, means for controlling the attitude of the plane of rotation of said wing whereby to control the flight of said aircraft, a universally mounted, non-rotating plate, means including a mechanical linkage operatively connected with said plate and said wing for maintaining said plate normally parallel to the plane of rotation of said wing, a reference attitude device, means connected with said plate and said reference device for detecting angular deviation therebetween, and power means controlled by said deviation detecting means for actuating said propeller controlling means.

11. In a flight control apparatus for a rotary wing aircraft, means for controlling the attitude of the plane of rotation of said wing whereby to control the flight of said aircraft, a servo motor connected to control said control means, a reference attitude device mounted in the fuselage of said aircraft for defining the desired plane of rotation of said wing, a member connected to and positioned by said wing to be thereby maintained in a plane normally parallel to the plane of rotation of said wing, means connected with said reference attitude device and said member for producing a signal proportional to deviation between the planes defined by said device and said member, and means for supplying said deviation signal in controlling relation to said servo motor whereby said motor will control the attitude of the plane of rotation of said wing to return said member and reference device to a position of alignment therebetween.

12. In a flight control apparatus for a rotary wing aircraft, means for controlling the attitude of the plane of rotation of said wing whereby to control the flight of said aircraft, signal responsive motive means for actuating said control means, means for defining a reference plane, a member connected to and positioned by said wing to thereby be maintained in a plane normally parallel thereto, signal producing means connected to said last-mentioned means for providing a signal corresponding to deviation between said last mentioned means and said reference means, and means for supplying said signal to said signal responsive means.

13. In a flight control apparatus for a rotary wing aircraft, means for controlling the orientation of the plane of rotation of said wing whereby to control the flight of said aircraft, a signal responsive servo motor for actuating said control means, a universally mounted non-rotating member, means including a mechanical linkage operatively connected with said member and said wing for maintaining said member normally parallel to the plane of rotation of said wing, an attitude reference device, signal producing means connected with said member and said reference device for producing a signal dependent upon the relative angular displacement between said member and said reference device, and means for supplying said signal in controlling relation to said servo motor.

14. In a flight control apparatus for a rotary wing aircraft, means for controlling the attitude of the plane of rotation of said wing whereby to control the flight of said aircraft, signal responsive motive means connected to actuate said control means, means mounted on the fuselage of said craft defining a horizontal reference plane, a first signal generating means for producing a signal dependent upon deviation between the horizontal attitude of said fuselage and said reference plane, a member, means connected to and positioned by said wing for maintaining said member in a plane normally parallel to the plane of rotation of said wing, a second signal generating means comprising a stator connected to be positioned in accordance with tilting movements of said member relative to the fuselage and electrically connected to receive the deviation signal from said first signal generating means, said second signal generating means including a rotor winding electrically connected in controlling relation to said signal responsive motive means, whereby said signal generating means will produce a control signal only upon relative displacement between said member and said reference plane.

MORTIMER F. BATES.

REFERENCES CITED

The following references are of record in the file of this patent:

UNITED STATES PATENTS

| Number | Name | Date |
| --- | --- | --- |
| 1,905,776 | Wilford | Apr. 25, 1933 |
| 2,023,105 | Smith | Dec. 3, 1935 |
| 2,280,116 | Carlson | Apr. 21, 1942 |
| 2,352,342 | Pitcairn | June 27, 1944 |
| 2,352,404 | Pitcairn | June 27, 1944 |
| 2,368,698 | Young | Feb. 6, 1945 |
| 2,376,523 | Synnestvedt | May 22, 1945 |
| 2,385,881 | Peterson | Oct. 2, 1945 |
| 2,427,939 | Woods | Sept. 23, 1947 |